(12) United States Patent
Safford et al.

(10) Patent No.: US 8,479,029 B2
(45) Date of Patent: *Jul. 2, 2013

(54) METHODS AND APPARATUSES FOR REDUCING STEP LOADS OF PROCESSORS

(75) Inventors: Kevin Safford, Fort Collins, CO (US); Rohit Bhatia, Fort Collins, CO (US); Chris Bostak, Fort Collins, CO (US); Richard Blumberg, Fort Collins, CO (US); Blaine Stackhouse, Fort Collins, CO (US); Steve Undy, Fort Collins, CO (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/167,970

(22) Filed: Jun. 24, 2011

(65) Prior Publication Data

US 2011/0252255 A1    Oct. 13, 2011

Related U.S. Application Data

(63) Continuation of application No. 11/900,316, filed on Sep. 11, 2007, now Pat. No. 7,992,017.

(51) Int. Cl.
*G06F 1/26*    (2006.01)
*G06F 1/32*    (2006.01)

(52) U.S. Cl.
USPC ........... 713/320; 713/300; 713/323; 713/340; 714/42

(58) Field of Classification Search
USPC ..................... 713/300, 320, 323, 340; 714/42
See application file for complete search history.

(56) References Cited

U.S. PATENT DOCUMENTS

| 5,991,884 | A | 11/1999 | Lin et al. |
| 7,263,567 | B1 * | 8/2007 | Subramaniyam et al. ..... 710/260 |
| 7,992,017 | B2 * | 8/2011 | Safford et al. ................ 713/320 |
| 2003/0105901 | A1 | 6/2003 | Wolrich et al. |
| 2005/0138450 | A1 | 6/2005 | Hsjeh |
| 2006/0005082 | A1 | 1/2006 | Fossum et al. |

* cited by examiner

*Primary Examiner* — Kim Huynh
*Assistant Examiner* — Michael J. Brown
(74) *Attorney, Agent, or Firm* — Trop, Pruner & Hu, P.C.

(57) ABSTRACT

Methods and apparatuses for reducing step loads of processors are disclosed. Method embodiments comprise examining a number of instructions to be processed by a processor to determine the types of instructions that it has, calculating power consumption by in an execution period based on the types of instructions, and limiting the execution to a subset of instructions of the number to control the quantity of power for the execution period. Some embodiments may also create artificial activity to provide a minimum power floor for the processor. Apparatus embodiments comprise instruction type determination logic to determine types of instructions in an incoming instruction stream, a power calculator to calculate power consumption associated with processing a number of instructions in an execution period, and instruction throttling logic to control the power consumption by limiting the number of instructions to be processed in the execution period.

15 Claims, 6 Drawing Sheets

METHODS AND APPARATUSES FOR REDUCING STEP LOADS OF PROCESSORS

This application is a continuation of U.S. patent application Ser. No. 11/900,316, filed Sep. 11, 2007 now U.S. Pat. No. 7,992,017, the content of which is hereby incorporated by reference.

FIELD

The embodiments herein relate to the field of integrated circuit devices. More particularly, the embodiments relate to methods and apparatuses for controlling or reducing step loads of processors.

BACKGROUND

Designers may increase performance of processors and integrated circuit devices by improving their internal algorithms or methods of executing instructions. In many cases, improving the execution of instructions requires increasing the number of components in those devices, such as transistors, resistors, etc. Today it is not uncommon to have complex integrated circuit devices, such as processors or application specific integrated circuits, which contain millions, even billions, of transistors. Additionally, designers may increase performance of processors and integrated circuit devices by increasing the operating frequencies. These increased operating frequencies, the coupled with increasingly larger and larger numbers of components in such devices, have created numerous problems.

One problem related to these increased operating frequencies and integrated circuit devices with millions of transistors is a phenomena referred to as step load. Operating integrated circuit devices that have millions of switching devices at high frequencies tends to rapidly change the amount of operating current and power consumption of the devices. For example, modern processors may see rapid increases in processor power demands that approach 100 amps in fewer than 10 clock cycles, when the demands are not controlled. This step change in power consumption load, sometimes referred to as "di/dt", is the difference between maximum and minimum power consumption of the system within a specified time interval. For a system to operate correctly, the power supply must be capable of maintaining voltage levels within a tight tolerance. If power consumption of the system varies widely over a short period of time, this power variation complicates power distribution which in turn increases the total cost of the system.

A large change in current over a very small amount of time will cause the power supply to droop or spike. This can cause issues both with timing (primarily slowing the circuits down in response to a voltage droop), as well as will both VccMin and VccMax issues (circuit operability). Excessive step loads lead to large frequency and voltage guard bands. As circuits become increasingly dense, with higher numbers of switching devices and even more operating units or processor cores on a single circuit die, this problem of step load will only become worse.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION

Figure 1:
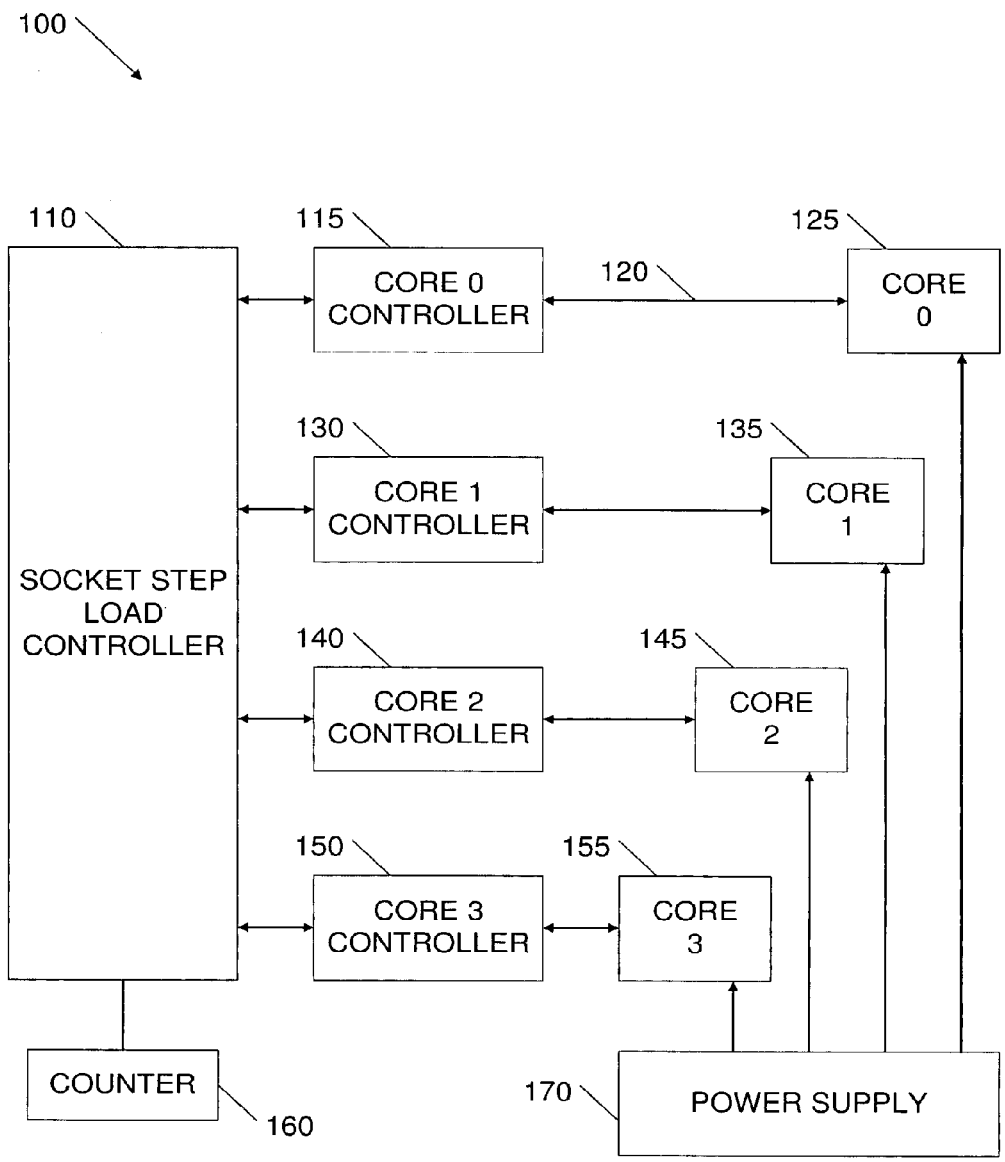
FIG. 1 depicts a system having four processing cores, each core having a core controller, and a system controller that may control step load in one or more embodiments.

The following is a detailed description of embodiments depicted in the accompanying drawings. The specification is in such detail as to clearly communicate the embodiments. However, the amount of detail offered is not intended to limit the anticipated variations of embodiments; but on the contrary, the intention is to cover all modifications, equivalents, and alternatives consistent with the spirit and scope of the embodiments as defined by the appended claims.

Various embodiments for controlling or reducing step loads of processors are illustrated and discussed. One or more embodiments comprise examining a number of instructions to be processed by a processor to determine the types of instructions, calculating power consumption by the processor in a cycle or other period of execution based on the types of instructions, and limiting the execution to a subset of instructions of the number to control the quantity of power for the execution. Some method embodiments may also create artificial activity to provide a minimum power floor for the processor. For example, an embodiment may create the artificial activity by turning on a clock to keep clock switching power constant, changing data patterns, or switching on circuits with power resistors.

One or more embodiments may adjust the artificial activity based upon a calculation of a quantity of power required to execute a series of instructions, in order to operate one or more processor cores at predefined power levels. Some embodiments may limit execution of instructions of individual cores of a processor to control the power consumption of the individual cores and to operate the individual cores at the predefined power levels. One or more embodiments may look for types of instructions which may consume relatively large amounts of power, such as memory instructions, floating point instructions, multimedia execution unit (MMU) instructions, or single instruction multiple data (SIMD) instructions.

Some embodiments may use processing logic to determine types of instructions in an incoming instruction stream, use a power calculator to calculate power consumption associated with processing a number of instructions in an execution period of the processor based on the types of instructions, and use an instruction throttling logic to control the power consumption by limiting the number of instructions to be processed in an execution period. At least one embodiment may also have one or more activity generators to generate activity in the processor.

Some embodiments may have multiple instruction throttling logic modules to limit instruction processing for the multiple cores. Multiple activity generators may generate varying levels of activities in multiple cores based upon amounts of throttling by the multiple instruction throttling logic modules. Some embodiments may have multiple core controllers, for the multiple cores, to manipulate the multiple activity generators based upon operation of the instruction throttling logic. In some embodiments, the multiple core controllers may manipulate the multiple activity generators to operate the multiple cores at predefined power levels. One or more embodiments may transmit one or more requests to a system controller to change operation of one or more of the cores from one predefined power level to another predefined power level. One embodiment may allow different cores of the processor to operate at different predefined power levels.

Turning now to the drawings, FIG. 1 depicts a system 100 that may control step load or instantaneous changes in current demands of a processor. The techniques to control step load for system 100 may also help reduce guard banding, such as processor temperature guard bands that would otherwise require some type of self-throttling mechanism which would decrease performance of the processor. System 100 may employ several techniques to reduce the amount of step load over a very short amount of time. The actual form of system 100 may vary in different embodiments. For example, system 100 may comprise part of a portable computing device such as a laptop or notebook computer, a handheld computer, or even a cellular telephone. In other embodiments, system 100 may be implemented in an industrial computing device, such as a server, a supervisory control and data acquisition (SCADA) device, or a distributed control system (DCS) used to control a process in a manufacturing facility. In even further embodiments, system 100 may comprise part of a consumer electronic device, such as a video camera or a digital video recorder (DVR).

An embodiment may have multiple cores that operate independently from each other. For example, system 100 has four processing cores, core 125, core 135, core 145, and core 155, each of which may operate independently from the others. For example, core 125 may process operating instructions for a virtual machine running a first operating system. At the same time core 125 is processing the operating instructions for its virtual machine, core 135 may process operating instructions for a different virtual machine running a different operating system. Alternatively, in one or more embodiments, the four processing cores may operate in conjunction with one another. For example, core 145, core 155, and core 125 may process multiple processing threads in a multitasking environment under a single operating system.

An embodiment may have one or more power supplies to supply power to one or more cores. For example, power supply 170 may provide operating current for each of the cores, as well as for other components of system 100. In different embodiments, the form of the power supply may vary. For example, in one embodiment the power supply may comprise a 500 Watt switching mode power supply that operates at a nominal 120 volts alternating current (VAC). In another embodiment, the power supply may comprise a battery and associated electronics that generate various magnitudes of direct current (DC) voltage used to operate the cores and other components of a system.

Each processing core of a system may have an associated core controller. As illustrated in FIG. 1, core 125 has associated core controller 115. Similarly, core 135 has associated core controller 130. Core 145 has associated core controller 140, while core 155 has associated core controller 150. In one or more embodiments with multiple core controllers, each core controller may monitor the operation of its respective core and make numerous adjustments to keep the core operating within predefined power levels in order to minimize the impact on the power supply and operation of the rest of the system. For example, each of the four cores (125, 135, 145, and 155) may be operated within six different power levels. A first power level may be referred to as "Power Level 0", a second power level referred to as "Power Level 1", and so on up to "Power Level 5" for a sixth power level. These different power levels are for one embodiment. Other embodiments may have more or fewer predefined power levels.

When operating at one power level, such as Power Level 5, a core may be operating in a relatively unrestricted fashion. In other words, the power level may provide the core with all the power that it needs to process instructions as rapidly as it is able. Operating unrestricted in such a manner, however, may result in the core consuming large quantities of current and associated power. Conversely, when a core operates at a different power level, such as Power Level 0, it may operate much more slowly and process far fewer instructions than Power Level 5. Operating in this more restricted mode may allow the core to operate using a much smaller current. However, operating more slowly may result in the performance of the core being reduced.

To maintain a core at a specific power level, in one or more embodiments, a core controller may monitor the execution of instructions in the core. A core controller may examine the instructions that are being sent to the core and try to identify instructions that may cause a shift in the power level. For example, core controller 140 may be operating core 145 at Power Level 4, such that core 145 has an average instruction execution rate of one instruction every three clock cycles. Core controller 140 may determine that an instruction about to be executed by core 145 is a high-power instruction. In other words, the pending instruction may consume twice as much power to process as an average instruction.

One should note that the rate of executing instructions may vary from embodiment to embodiment, as well as within a single embodiment. In other words, a core may execute one instruction every three clock cycles under one set of operating conditions, yet the core may execute three instructions per cycle under another set of operating conditions. For example, the core may be able to perform parallel instruction execution. In the case of multiple instruction execution, one may substitute "group of instructions" for the single "instruction". In other words, a core controller may determine that one or more instructions in a group of instructions are high-power instructions.

Depending on the embodiment, a core controller may respond to a pending "high-power" instruction(s) in different ways. For example, in one embodiment core controller 140 may try to maintain the power consumption for core 145 within the predefined range limits for Power Level 4 and delay the issuance of the instruction. The core controller may issue the instruction to the core at the appropriate time in order for it to be executed. In other words, a core controller may throttle the issuance of the high-power instruction so that the average power consumption is in line or more consistent with the power consumption of instructions that consume less power. In some embodiments, a core controller may not attempt an averaging technique but merely delay processing too many high power instructions in a single execution period. For example, a core controller may allow a core to process as many "low-power" instructions as it is capable of processing but limit the number of high-power instructions that the core may process in a period of time, such as no more than one instruction every three cycles or two instructions every five cycles, etc. If the processor is executing groups of instructions per cycle, such as in the case of an out-of-order processor, it may split up the instructions of those groups and execute subsets of the group sequentially.

An embodiment may employ another technique which throttles instruction dispersal among the individual cores as a collective whole instead of only throttling instructions at the core level. For example, socket step load controller 110 may monitor instruction issuance across all four cores and control the instruction dispersal rate to individual cores to keep the average power consumption for one or more cores at a certain level. For this example, assume all four cores are operating and each executing an average of one instruction per execution period. If core 155 ceases executing instructions, socket step load controller 110 may compensate by increasing the execution rate of core 125 from one instruction per execution period to two instructions per execution period.

Worth pointing out, the duration of what is considered to be an execution period may vary from embodiment to embodiment. For example, in one embodiment an execution period may comprise one clock cycle, such as a clock cycle of a core. In another embodiment, the execution period may comprise three clock cycles, six clock cycles, etc. In even further embodiments, the execution period may comprise part of a clock cycle, such as may be the case when instructions are executed on the leading edge and trailing edge of the clock cycle. In other words, an execution period may be thought of in terms of some quantity or duration of time, instead of a clock cycle.

To assist in maintaining each of the cores within a specific power level, an embodiment may employ various artificial activity systems to raise average power in each core. In some embodiments, control logic or some other mechanism may operate to increase or decrease the artificial activity based on the execution rate of an associated core. For example, an artificial activity mechanism associated with core 135 may be operating at a relatively low level and generating very little artificial activity when core 135 is executing instructions at a rapid rate. The combination of the artificial activity and the power consumed by core 135 to execute instructions may be the equivalent of, e.g. Power Level 5. However, if core 135 ceases or slows the rate of instruction execution, core controller 130 may recognize this condition and increase the amount of artificial activity generated by the artificial activity mechanism to maintain the power consumption of core 135 and the artificial activity mechanism associated with core 135 within the predefined limits of Power Level 5. By adjusting the artificial activity level, a core controller may maintain the power level of a core and an artificial activity mechanism at a specific power level. To conserve power, the core controller may subsequently decrease the activity of the artificial activity mechanism but do so in a slow and controlled manner so as to minimize or eliminate the impact of the step load change.

A system may also have a socket step load controller monitor instruction issuance across numerous cores and change both instruction dispersal and artificial activity accordingly. The goal of one or more embodiments may be to allow for relatively high performance while simultaneously minimizing the overall average power, with the least amount of artificial activity possible, and minimizing the performance impact of other necessary operational restrictions, such as instruction throttling due to temperature guard bands.

In one or more embodiments, core controllers may be individually coupled to individual cores via bidirectional links. For example, bidirectional link 120 may allow bidirectional communication between core controller 115 and core 125. A core controller may receive information from a core about the types and execution rate of instructions for the core via the bidirectional link. Based on the information received, the core controller may increase or decrease the activity of the artificial activity mechanism associated with the core to maintain the core at a specific power level.

If a controller determines that the performance of a core may be improved by increasing the power level to allow the core to execute more instructions in an execution period, the core controller may allow the core to change from one power level to another. However, before allowing the core to change power levels, the system may require that the core controller first request permission from a controller that monitors and/or controls numerous core controllers, such as socket step load controller 110. For example, requiring core controller 115, as well as the other core controllers of system 100, to first request permission from socket step load controller 110 before changing power levels may allow socket step load controller 110 to control the step load on system 100. By requiring the individual core controllers to request permission for power level changes, a socket step load controller may prevent each of the core units from instantaneously or rapidly transitioning from the lowest power level to the highest power level. To control the overall step load on a system, a socket step load controller may monitor the requests from each of the core controllers. For example, socket step load controller 110 may monitor core controllers 115, 130, 140, and 150 for requests to either increase or decrease the power levels associated with cores 125, 135, 145, and 155, respectively.

As depicted in FIG. 1, socket step load controller 110 may communicate with each of the core controllers via bidirectional links. In alternative embodiments, a socket step load controller may communicate with one or more of the controllers via unidirectional links. For example, socket step load controller 110 may, in a different embodiment, monitor two unidirectional links into socket step load controller 110 from controller 140. Core controller 140 may assert one unidirectional link high to request a power level increase or assert the second unidirectional link high to request a power level decrease. Similarly, a socket step load controller may communicate permission to increase or decrease the power level for a core by asserting one unidirectional link high when the power level may be increased or asserting another unidirectional link high when the power level may be decreased.

In one or more embodiments, a socket step load controller may utilize counters to quantify the passage of time when granting permission to a request from a core for a power level change. For example, counter 160 may aid socket step load controller 110 in determining whether sufficient time has passed, from the standpoint of minimizing the impact of step load, for granting permission for changes in power levels for each of the core controllers. In one embodiment, the counter may comprise a programmable six-bit counter. The counter may specify the minimum number of cycles or execution periods between each change in power level. For example, after a decrease or increase of a power level of one of the core units, socket step load controller 110 may trigger counter 160. Counter 160 may then start monitoring a clock signal of system 100 and start counting up to or down from a predetermined count value. If one of the core controllers requests a decrease or increase of the power level before counter 160 reaches its preset, socket step load controller 110 may delay granting permission to change the power level until counter 160 reaches the preset.

In some embodiments, the counter unit may contain multiple counters that may provide different time intervals for different step load time domains. For example, factors such as silicon manufacturing, packaging of the integrated circuits, and power supplies may have different frequency responses to changes in desired power levels. The techniques described herein may apply to controlling or managing step loads of different frequency domains.

One may note that system 100 depicted in FIG. 1 has four cores. However, depending on the embodiment, a system may have more or fewer cores. For example, one embodiment may only have one core. Another embodiment may have eight, sixteen, or even more cores. Likewise, system 100 has four core controllers. Different systems of alternative embodiments may have more or fewer core controllers. Additionally, the ratios of the number of core controllers to the number of cores, as well as the ratios of the number of system controllers to the number of core controllers, may vary from embodiment to embodiment. For example, an embodiment may have one core controller that controls two cores. Another embodiment may combine the individual core controllers and the system controller into a single controller apparatus.

Different embodiments may implement different arrangements of cores, core controllers, and socket step load controllers. An embodiment may implement numerous components into a single integrated chip package. For example, one embodiment may implement all components of system 100, except for power supply 170, into a single socket or integrated circuit chip package. In other embodiments, some components may be in one chip package while other components are in another chip package. For example, the core controllers and the cores may be in one integrated circuit chip package while the system controller is implemented in a block of another integrated circuit package, such as an application specific integrated circuit (ASIC). As one may readily appreciate, system 100 depicted in FIG. 1 is intended to provide an illustrative example. Various embodiments may arrange their components in different manners.

Figure 2:
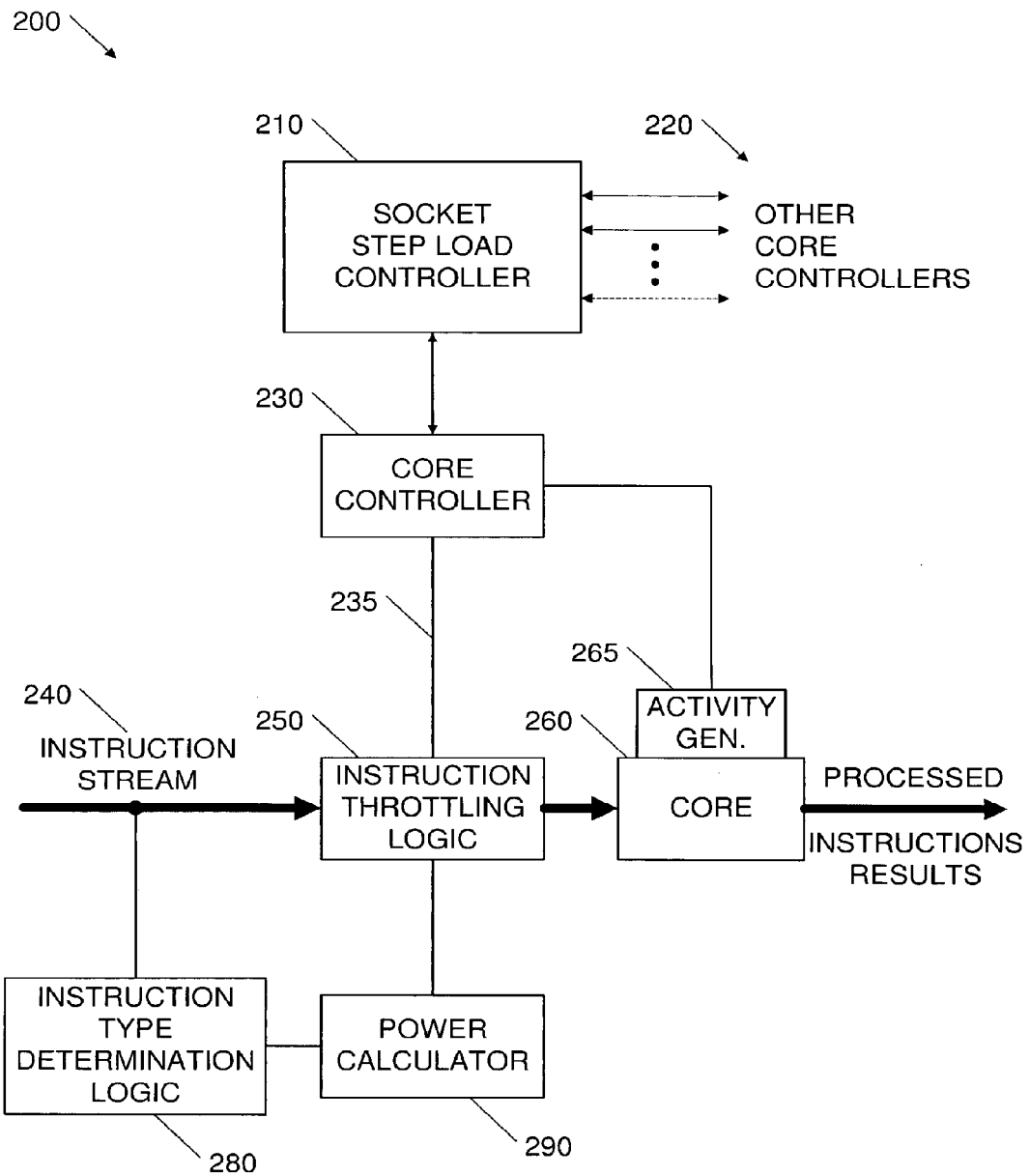
FIG. 2 shows an apparatus for controlling step load of a core.
Figure 4:
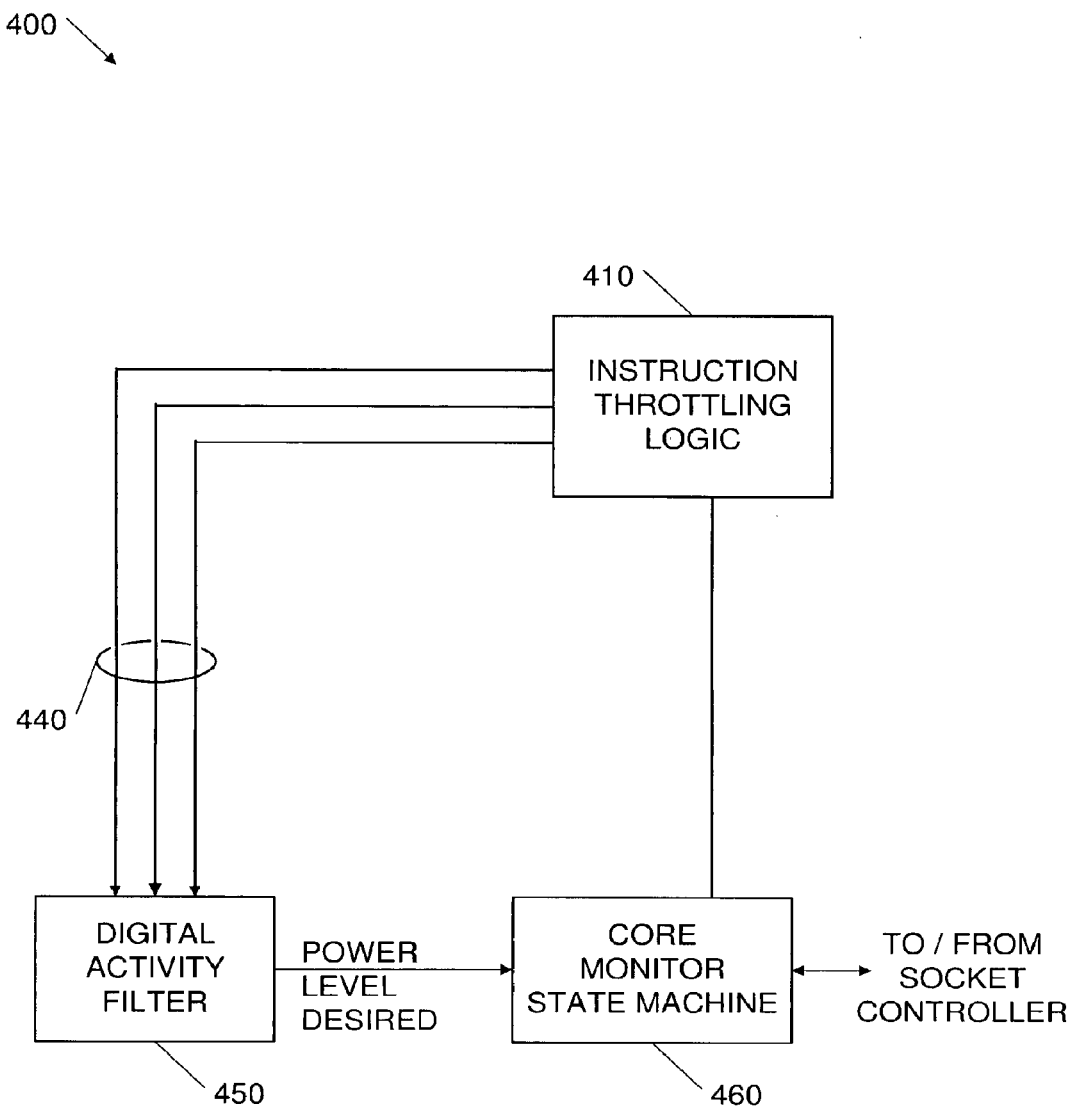
FIG. 4 depicts an apparatus for monitoring and controlling step load of a core.

To illustrate in more detail how the elements of a system may reduce and/or control step loads on a processor, we turn now to FIG. 2. FIG. 2 shows an apparatus 200 for controlling step load of a core 260 having an instruction throttling logic 250, a core controller 230, and an activity generator 265. Apparatus 200 may form, by way of an illustration, part of a system like system 100, such as one of the core and core controller pairs. In other words, system 100 in FIG. 1 may comprise four apparatuses 200, excluding socket step load controller 210, with one apparatus 200 for each core controller and core pair. FIG. 2 may represent a simplified block diagram to illustrate how components may operate to reduce step load of a core of a processor. FIG. 2 is not intended to represent a particular processor, such as an out-of-order processor. How a processor may throttle instructions in one or more embodiments is illustrated later in the discussion for FIG. 4.

In one embodiment, an apparatus may control the number of instructions being executed by a core at a particular time by controlling the instruction issue rate with dispersal logic of instruction throttling logic and a core controller. For example, a system implementing apparatus 200 for a single core may be capable of executing up to six instructions per clock cycle. However, in certain cases, instruction stream 240 may transition from a sequence containing very low-power instructions to a sequence containing several very high-power instructions. While apparatus 200 may strive to routinely allow core 260 to execute as many low-power instructions as it is capable of executing in an execution period, such as six low-power operations per cycle, apparatus 200 may need to restrict the number of high power operations in order to control step load.

To control step load by restricting the number of high-power operations a core performs, an embodiment may have logic that examines the types of instructions in the incoming instruction stream and calculates the amounts of power that executing the individual instructions are expected to require during processing. For example, apparatus 200 may address the problem of step load by having logic in instruction type determination logic 280 and in power calculator 290 that examines incoming instruction stream 240 and determines how many high-power instructions, as well as what type, are present. Based on the instruction information, such as the instruction types and execution power requirements, an apparatus may "throttle" execution by only issuing a certain subset of instructions from the instruction stream to a core if there are too many high power operations present in a cycle or execution period.

In various embodiments, logic of an instruction type determination module may monitor for specific types of instructions. For example, instruction type determination logic 280 may monitor instruction stream 240 for memory instructions, floating point instructions, multimedia execution unit (MMU) instructions, and single input multiple data (SIMD) instructions. The exact type and number of instructions that logic of an embodiment monitors for may vary from embodiment to embodiment. For example, as processor architectures may differ from one embodiment to the next, so too may quantities of power required by the various instructions. An instruction that consumes a relatively large quantity of power in one embodiment may actually execute more efficiently and consume less power in a different embodiment having a different processor architecture or microarchitecture.

Continuing with the example, instruction type determination logic 280 may examine instruction stream 240 for the four types of instructions, noted above, in sufficient detail to determine how many of each type there are in instruction stream 240, calculate or at least infer the power impact that executing such instructions will have on core 260 as well as the system associated with core 260, and then, based on these determinations, assert stop bits via instruction throttling logic 250 to limit the number of instructions issued in a given cycle or execution period. Furthermore, instruction throttling logic 250 may communicate the extent of the throttling to core controller 230 via a signal on communication link 235. For example, communication link 235 may comprise a series of status lines that core controller 230 may monitor. In addition, instruction throttling logic 250 may also send an "issued" signal to core controller 230 via communication link 235 that communicates whether or not instructions are issued for the execution period. In other words, core controller 230 may monitor a one or more status lines in communication link 235 to determine whether core 260 has stalled. A core controller may communicate such a stalled condition to a socket step load controller so that the socket step load controller may respond accordingly, such as allowing one or more other cores to increase in power levels.

To provide a power "floor" inside a core, an apparatus may couple an activity generator to the core that may generate some type of power consuming activity in the core or for the core, such as "artificial activity". For example, apparatus 200 has activity generator 265 coupled to core 260. In at least one embodiment, the term artificial activity may refer to hardware of the core performing some type of activity to maintain a relatively constant rate of power consumption instead of being idle. Depending on the embodiment, such activity may or may not serve another purpose, such as providing additional computational logic to increase processor throughput. In other words, in at least some embodiments the artificial activity may serve no other purpose than to increase power consumption when triggered, while in other embodiments such activity may actually perform some useful function. For example, an apparatus may generate artificial activity by turning on clocks of previously idle logic structures to keep clock switching power constant. In alternative embodiments, an activity generator may increase power consumption by changing data patterns or by sending current through power resistors to raise the average power level of a particular unit. From the standpoint of excessive energy consumption, an embodiment may be designed to not increase the overall average power of the unit for a core. However, under some operational circumstances in some embodiments, the overall average power may increase due to operation of the activity generator, or generation of the activity.

The artificial activity described for the unit of a core may vary depending on the current power level of the core. For example, while operating core controller 230 may decode the power level to select a programmable "amount" of artificial activity. Core controller 230 may determine the amount of current flow into core 260 during each cycle by monitoring a state machine configured to calculate or approximate instantaneous power of core 260. Core controller 230 may instruct activity generator 265 to change the amount of activity at the same time in the pipeline as the dispersal throttling of instruction throttling logic 250. In other words, as instruction throttling logic 250 performs more and more throttling, core controller 230 may sense this via communication link 235 and trigger activity generator 265 to compensate by generating more activity. Generating additional activity during instances of instruction throttling may allow an embodiment to maintain a relatively constant rate of power consumption.

In one or more embodiments, a core controller may reduce artificial activity generation when instruction throttling decreases. For example, as the amount of throttling performed by instruction throttling logic 250 decreases, core controller 230 may again respond by instructing activity generator 265 to reduce its activity generation. In other words, a core controller may respond to the amount of throttling by causing an activity generator or some other activity generation logic to produce more or less activity in order to keep the power consumption rate of a device or apparatus of an embodiment relatively constant.

An embodiment may employ an overall controller mechanism to manage step load of a core. This overall controller mechanism may comprise two parts. First, as just described an apparatus, such as apparatus 200, may employ a core controller to monitor the amount of throttling performed by instruction throttling logic. Based on the amount of throttling, the core controller may make power level increase and decrease requests based on that activity. For example, core controller 230 may make these requests to socket step load controller 210.

The second piece of a controller mechanism may comprise, in at lease one embodiment, a socket controller to interact or interface with more than one core controller. As depicted in FIG. 2, socket step load controller 210 may interface with other core controllers 220. For example, socket step load controller 210 may correspond to socket step load controller 110 in FIG. 1, core controller 230 to core controller 115, and other core controllers 220 to core controllers 130, 140, and 150. In other words, depending on the embodiment, each core in a processor of a system may have one corresponding core controller. The socket step load controller may monitor the operation of multiple core controllers. The socket step load controller may receive outputs from the individual core controllers and make decisions concerning which cores may be allowed to increase or decrease their power levels, including when the cores may make those power level changes.

To accomplish this, an embodiment that has a socket step load controller may employ a number of "power levels". These power levels may be predefined for each core. For example, core 260 and the cores of other core controllers 220 may operate at six different power levels. Alternatively, in different embodiments, each core may have its own set of predefined power levels that differs from one or more of the other cores. For example, system 100 has cores 125, 135, 145, and 155. Each core may have its own predefined power levels. Continuing with the example, if core 125 and core 135 are similar in design, the predefined power levels for both cores may be the same. Alternatively, the design of core 125 may differ from the design of core 135. This may be the case when core 125 is a core designed for a special function, such as for processing multimedia instructions. In this case, core 125 may have a certain set of predefined power levels while core 135 has another set.

Each power level may include a lower limit or power "floor". By using artificial activity, such as that generated by activity generator 265, a core controller may monitor the operation of the core and generate sufficient artificial activity to keep the power level above this power floor. Each power level may also include an upper limit or power "ceiling". The core controller may use instruction dispersal throttling to keep the power level below this power ceiling. The core controller may then allow the core to move up in power level, thereby reducing throttling at a cost of increased average power, or move down in power level, causing additional throttling but reducing average power. Other core controllers, such as core controllers 220, may perform similar actions for their cores. As a result, the amount of step load caused within each core may be more easily managed and limited to the difference between the "floors" and "ceilings". In addition, an embodiment having an apparatus similar to apparatus 200 may experience a dramatic reduction in step load, because all of the individual cores will not be allowed to transition from their lowest power level to their highest power level instantaneously, which would be the case without an apparatus like apparatus 200.

As mentioned, a socket step load controller may monitor all of the increase and decrease requests from the various core controllers and decide when to grant power level changes to each core based on other activity in the rest of the socket. When an individual core makes a request, two things may happen. First, the socket step load controller may check one or more counters to determine whether a power change should be permitted. For example, step load controller 110 may check a counter 160, to make sure the change should be permitted. A socket step load controller may choose to temporarily disallow the request if the request arrives too soon after a previous power change. Second, the socket step load controller may also check the other core controllers to determine whether they are also making requests. One should note that the counters that the socket step load controller examines may also be affected by the power level changes according to constraints of longer time periods for according to different components or capabilities of the power delivery system. For example, the counter operation may be configured to take into account such factors as the silicon manufacturing, the packaging of the circuit(s), and power supplies mentioned previously.

In one or more embodiments, an apparatus may not allow consecutive power level changes too quickly, such as before a predetermined amount of time has lapsed in between changes. When a power level change is granted to any core, an embodiment may start a timer or counter, like counter 160. The socket step load controller may block any additional changes until the programmable time or programmable count value has been reached. For example, the counter may comprise a programmable 6-bit counter. The target value for the counter may be determined, or set, by various means including a system request sent to the socket step load controller. In an embodiment, an apparatus may continue monitoring the various core controllers for power level change requests until the timer value expires, at which point the apparatus may grant the change to one of the cores and start the process again.

Figure 3:
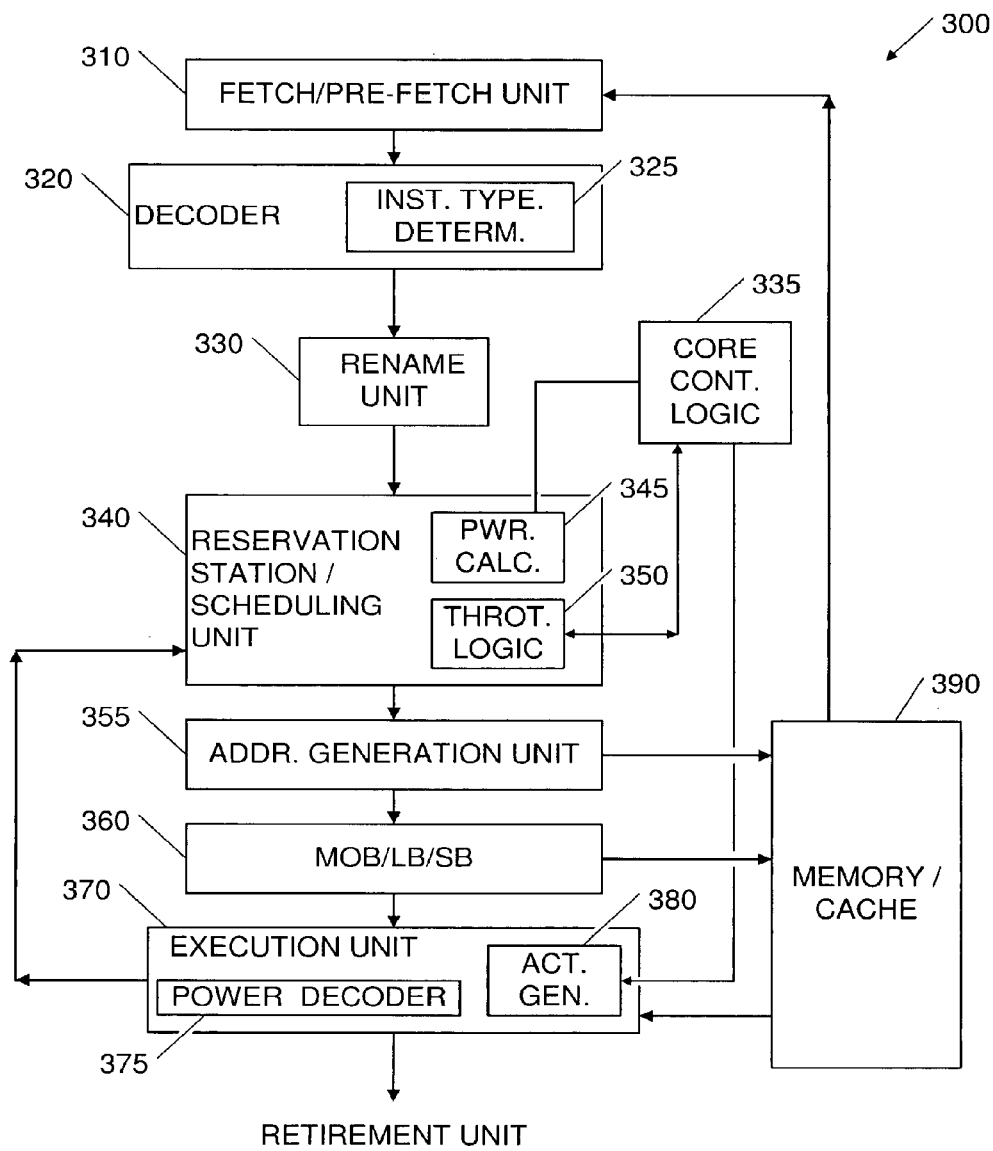
FIG. 3 illustrates how a core controller may control step load for an out-of-order processor core.

FIG. 3 illustrates how a core controller may control step load for an out-of-order processor core, according to at least one embodiment. Core 300 may comprise a portion of a processor executing code, such as code of an operating system and/or an application. One or more embodiments may allow the hardware of the core control or minimize step load in a system containing or coupled with the core. For example, core controller logic 335 may work in conjunction with throttling logic 350 and activity generator 380 to control step load of core 300, such that the power consumption of core 300 remains in a predetermined power level. In other words, core controller logic 335 may manipulate throttling logic 350 and activity generator 380 to ensure the core 300 consumes enough power to remain above a power "floor", or minimum threshold value, and ensure that the core also avoids consuming too much power in order to remain below a power "ceiling", or maximum threshold value. How core controller logic 335 may accomplish this regulation, in at least one embodiment, is discussed in the following paragraphs. Also, while not shown in FIG. 3, core controller logic 335 may interface with one or more socket step load controllers. For example, core controller logic 335 may interface with a socket step load controller like socket step load controller 110 shown in FIG. 1.

Core 300 may comprise a portion of a pipelined processor having multiple stages. For example, fetch/pre-fetch unit 310, decoder unit 320, rename unit 330, and reservation/scheduling unit 340 are a few stages of core 300. Fetch/pre-fetch unit 310 may comprise an in-order unit that receives a stream of instructions from memory 390. For example, in an embodiment memory 390 may comprise static random access memory (SRAM) cache. Additionally, depending on the embodiment, memory 390 may also comprise dynamic random access memory (DRAM) coupled to core 300 in some manner, such as by way of a bus interface unit. In one or more embodiments, a fetch/pre-fetch unit like fetch/pre-fetch unit 310 may retrieve a stream of operating instructions from memory, such as those for an application, a process, or an operating system.

Various embodiments may have a decoder unit that accepts a stream of instructions from a fetch/pre-fetch unit and decodes them into a series of micro-operations (uops). The decoder unit may have logic or state machine hardware that examines the individual instructions and/or micro-operations of the stream and determines which instructions or decoded micro-operations consume relatively large amounts of power when being executed. For example, core 300 may consume more power when executing an instruction that performs a division operation, or some other mathematical computation, as opposed to an instruction that only shifts bits. Decoder unit 320 may have instruction type determination logic 325 that recognizes the mathematical instructions whenever it encounters the instructions in the instruction stream and sets a certain bit or bits in the decoded instructions or uop(s), so that subsequent processing stages in core 300 may recognize that the instructions or uop(s) are "high-power" instructions and potentially control the time of their execution, if necessary. Conversely, instruction type determination logic 325 may not set the bit or bits for the shift instructions, as well as other "low-power" instructions. Worth emphasizing, the types of instructions which may be considered "high power" instructions versus those instructions considered to be "low power" instructions will vary from embodiment to embodiment. For example, one type of architecture may require relatively small amounts of power to process one or more types of instructions, such as certain types of multimedia or floating point instructions, while architecture in another embodiment may consume much larger quantities of power to process such instructions and deem those instructions as high-power instructions.

In an embodiment a rename unit, such as rename unit 330, may receive uops from a decoder unit and, based on the requirements of the uops, dynamically associate physical registers of execution unit 370 with architectural registers of the predefined Instruction Set Architecture (ISA) for core 300. To associate the physical registers with architectural registers, the rename unit may employ a register alias table. The physical registers may contain temporary values for instructions which have been completed but not yet retired, while architectural registers represented by the register alias table may store committed values.

In one or more embodiments, the core may then add status information to the uops processed by the rename unit and enter them into an instruction pool, wherein the instruction pool may comprise an array of content addressable memory referred to as a reorder buffer (ROB). Reservation/scheduling unit 340 may select uops from the instruction pool depending on their statuses. For example, reservation/scheduling unit 340 may determine that a uop has all of its operands and that the necessary execution unit to process the uop is available. If reservation/scheduling unit 340 determines that a uop does not have all of its operands, such as receiving a miss from one or more caches of memory 390, reservation/scheduling unit 340 may send the uop to address generation unit 355 and memory ordering buffer (MOB) 360 while the miss is refilled or accessed from other memory, such as DRAM memory of memory 390. Address generation unit 355 may generate target linear addresses corresponding to load and store operations while MOB 360 may maintain a list of active memory operations and suspend processing of uops waiting on cache refills until the refills have arrived.

A core may dispatch uops to the execution unit according to operand availability, execution unit resource availability, and instruction throttling requirements. For example, reservation/scheduling unit 340 may dispatch a uop to execution unit 270 whenever its operand(s) are available and execution unit 370 has the available resources. However, logic within the reservation/scheduling unit may recognize when the instruction or set of instructions about to be dispatched to the execution unit will cause the core to consume a large quantity of power which exceeds the power ceiling. For example, core 300 may be operating at a certain power level, such as "Power Level 3". To maintain core 300 at Power Level 3, core controller logic 335 may monitor the execution of instructions in the core. As illustrated in FIG. 3, core controller logic 335 may monitor the execution of instructions the instruction throttling logic 350. For example, core controller logic 335 may receive a signal from a digital activity filter coupled to instruction throttling logic 350. However, in an alternative embodiment, a core controller may monitor the execution of instructions in a different manner, such as by directly monitoring the operation of one or more stages of the core, such as by monitoring the operation of execution unit 370 via power decoder 375.

In one or more embodiments, the reservation/scheduling unit may examine the instructions that are about to be dispatched to the execution unit and try to identify instructions that may cause a shift in the power level via power calculation logic. Continuing with the example above, core controller logic 335 may be operating core 300 at Power Level 3. Power calculation logic 345 may calculate or otherwise determine the power requirements for one or more of the instructions that reservation/scheduling unit 340 is preparing to dispatch to execution unit 370. For example, power calculation logic 345 may determine that five instructions out of a total of seven pending instructions have certain status bits set, indicating they are high-power instructions.

Core controller logic 335 may monitor the operation of power calculation logic 345 and sense that the series of five high-power instructions are about to be executed. If unregulated, core controller logic 335 may determine that processing the series of high-power instructions too quickly will cause core 300 to consume power at a rate in the range of Power Level 5, as opposed to Power Level 3, and take appropriate action by having throttling logic 350 start slowing the instruction dispersal rate. In other words, core controller logic 335 may cause throttling logic 350 to reduce the rate that high-power instructions are sent to execution unit 370.

Aside from ensuring that a core does not exceed a power ceiling and jump into a higher power level, a core controller may also ensure that the core does not fall below a power floor and drop into a lower power level. While monitoring the operation of power calculation logic 345, core controller logic 335 may sense that reservation/scheduling unit 340 has been sending a series of high-power instructions to execution module 370. However, core controller logic 335 may sense that the number of high-power instructions is quickly decreasing. For example, the instruction stream of reservation/scheduling unit 340 may quickly transition from having predominantly high-power instructions to having predominantly low-power instructions. Alternatively, the application providing instructions to fetch/pre-fetch unit 310 may enter a phase where it is waiting on input from a user, causing the number of pending instructions to fall off dramatically. As a consequence, core controller logic 335 may predict that core 300 will soon consume power at a much lower rate and cause the core to drop from Power Level 3 to Power Level 1, if no action is taken.

Core controller logic 335 may respond to this change in the instruction stream in a couple of ways. If there are sufficient instructions pending for reservation/scheduling unit 340, core controller logic 335 may have throttling logic 350 start increasing the instruction dispersal rate. In other words, core controller logic 335 may cause throttling logic 350 to increase the rate that low-power and/or high-power instructions are sent to execution unit 370 in an effort to maintain the operation of core 300 in Power Level 3. However, if there are insufficient instructions pending, core controller logic 335 may respond by triggering activity generator 380. Activity generator 380 may cause core 300 to consume additional power in a variety of different ways, such as by clocking previously inactive logic structures in execution unit 370 or causing execution unit 370 to repetitively execute extraneous instructions, such as randomly generated floating point instructions.

One should note that the arrangement of FIG. 3 for core 300 is merely one arrangement that may be employed in one embodiment. Countless alternative arrangements and variations thereof are possible and may accomplish similar results. For example, in one alternative embodiment instruction type determination logic 325 may be located in reservation/scheduling unit 340 and work in conjunction with power calculation logic 345. In other words, the determination of whether an instruction is a high-power or low-power instruction may be delayed until a later stage in the core. In another alternative embodiment, the throttling logic may not reside in the reservation/scheduling unit. For example, throttling logic 350 may be located in address generation unit 355, MOB 360, or as part of execution unit 370. In even further embodiments, the numbers of stages will vary. For example, an embodiment may have two or more fetch/pre-fetch units, two or more decoders, etc.

An embodiment may employ an apparatus, such as apparatus 400, to reduce the amount of step load over a very short amount of time. Instruction throttling logic 410 of apparatus 400 may correspond to, by way of example, instruction throttling logic 250 depicted in FIG. 2. As mentioned above, each core may have logic or some other mechanism that monitors activity of core. For example, digital activity filter 450 may perform this monitoring function via activity signals of signal lines 440. Instruction throttling logic 410 may transmit activity signals via signal lines 440 that proportionally correspond to the amount of throttling by instruction throttling logic 410.

In an embodiment, a digital activity filter such as digital activity filter 450 may perform a logical computation to determine whether or not to request a power level increase or decrease. In one embodiment, the digital activity filter may comprise a relatively simple digital low-pass filter to make the decision of whether or not a power level increase or decrease should be requested. In the embodiment, processing logic such as logic of core monitor state machine 460 may receive the desired power level request and, based on machine state and other information such as that from instruction throttling logic 410, transmit the request to the socket controller so the socket controller may determine a final power level. In at least one embodiment, digital activity filter 450 may receive a 3-bit input based on an encoded value of the throttle information of instruction throttling logic 410. The digital activity filter may comprise other computational logic hardware, such as multipliers and an output comparator, which looks at the 3-bits to determine the desired power level.

In one embodiment, the core monitor state machine may monitor the power level increase and decrease grant signals from the socket controller, as well as some bypass conditions that may exist, to determine which power level a core should be in. One embodiment may only permit a core to transition between two adjacent power levels at once. In other words, the embodiment may not allow a core to transition between non-adjacent power levels, with only single level changes being permitted. For example, apparatus 400 may permit a change from Power Level 4 to Power Level 5, but not allow a core to change from Power Level 4 to Power Level 6, in a single power level transition.

Although various embodiments may employ different numbers of power levels, at least one embodiment may employ a total of eight power levels. The embodiment may use different designations to represent the individual power levels, such as Power Level 0 through Power Level 7. Power Levels 0 through 5 may represent actual power levels. An embodiment may use Power Levels 6 and 7 for special conditions. For example, Power Level 6 may be used to indicate that a core has halted. The embodiment may have Power 7 indicate that a core is disabled. Alternative embodiments may use other numbers of power levels, wherein at least some of the power levels may signal a variety of other conditions.

Figure 5:
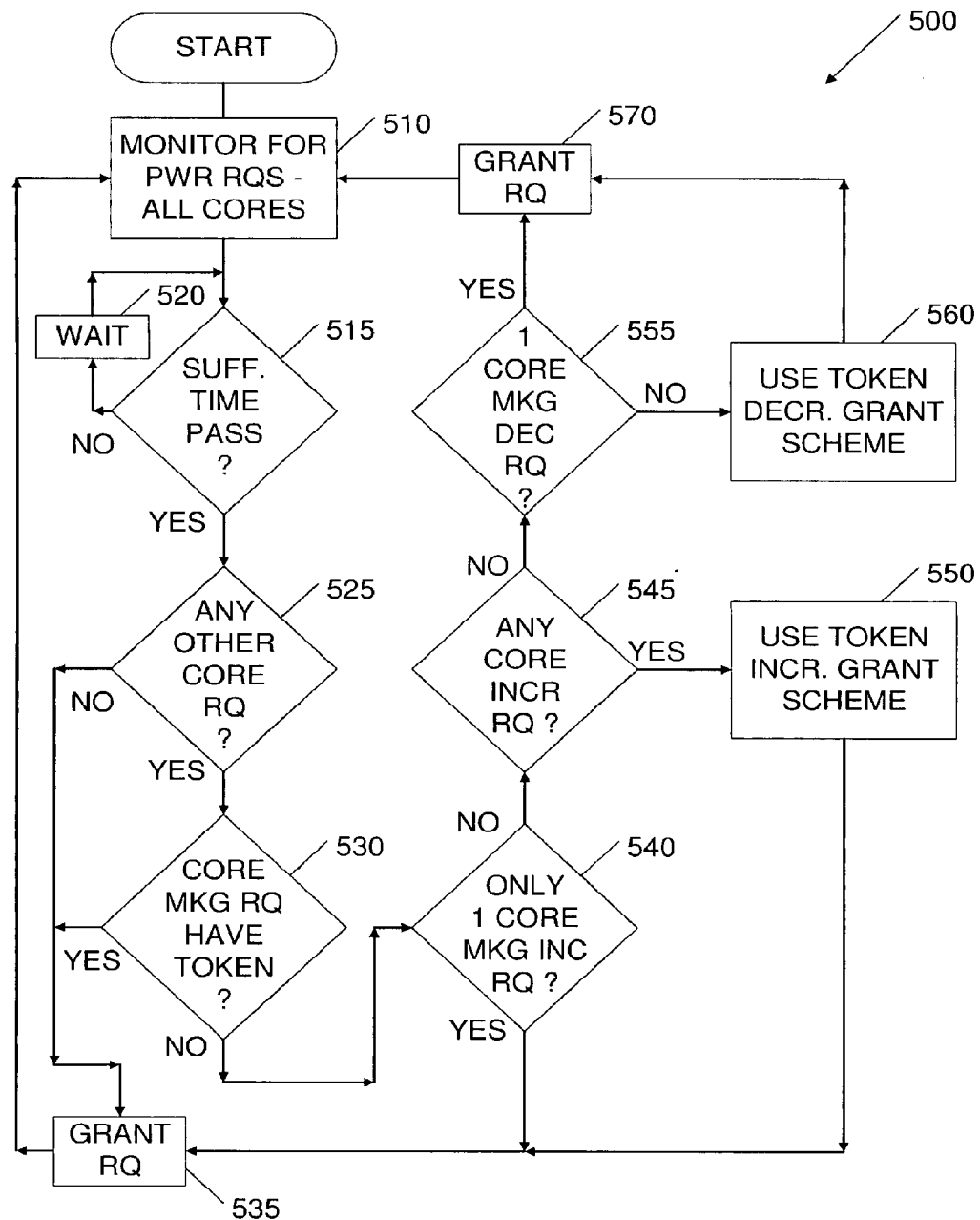
FIG. 5 illustrates an algorithm for a socket controller that may handle requests of processor cores for increases and decreases in operating power.

In order to illustrate how a socket step load controller, in one or more embodiments, may determine whether a request to change between different power levels should be granted, such as a request to change from Power Level 3 to Power Level 2, we turn to FIG. 5. As previously mentioned, a socket step load controller may receive the outputs from core controllers and make decisions concerning which cores may be allowed to increase or decrease their power levels. FIG. 5 depicts a flowchart 500 which illustrates a decision algorithm that a socket step load controller may employ, in one or more embodiments, when making the power level change decisions. The algorithm of flowchart 500 illustrates how a socket step load controller may use a token-based scheme to ensure fairness between the multiple cores. For example, if a processor employs four different cores, the system may pass a token in a ring from core 0, to core 3, to core 2, to core 1, and then back to core 0. However, an embodiment may only need to utilize this token scheme when multiple cores request power changes at the same time. Additionally, flowchart 500 may represent an algorithm for one embodiment. Other embodiments may use different algorithms and/or logic to determine how and when to allow changes of power levels.

The algorithm of flowchart 500 begins with a socket step load controller monitoring the cores for power change requests (element 510). In determining whether to grant the request, the socket step load controller may first determine whether sufficient time has passed (element 515). For example, the socket step load controller may consult a time or counter like counter 160 depicted in FIG. 1. If sufficient time has not passed, the socket step load controller may wait until the target value of the timer or counter is reached (element 520). After sufficient time has passed since the last power level change, the socket step load controller may determine whether a single core is making the request or whether multiple requests have arrived (element 525). If a single core makes a request, the socket step load controller may grant that core permission to make its change (element 535). However, when multiple cores make requests at the same time (element 525), the socket step load controller may need to evaluate numerous other factors in deciding when to grant permission to each of the requests.

If the core with the token is making a request (element 530), which may be either an increase or a decrease request, the request will be granted (element 535). If no core making a request, either increase or decrease, has the token, (element 530) and exactly one core is making an increase request (element 540), that increase request will be granted (element 535). If no core making a request, either increase or decrease, has the token (element 530), no cores are making an increase request (element 545), and exactly one core is making a decrease request (element 555), then that decrease will be granted (element 570).

If no core making an increase or decrease request has the token (element 530), and more than one core is making an increase request (element 545), the socket step load controller may employ a simple priority scheme pick between the cores making increase requests (element 550). For example, the socket step load controller may use a numbering scheme of "C3 & C2 & C1 & C0" for each of the cores, with rotation from C3 to C0, which may be identical to how the tokens are passed. If the socket step load controller uses this numbering and token passing scheme, the socket step load controller may grant the increase to the first core making a request to the "left" of the core with the token.

If no cores making a request have the token (element 530) and no core is making an increase request (elements 545 and 555), the socket step load controller may employ another simple priority scheme to pick between the cores making a decrease requests (element 560). For example, the first core making a request to the "left" of the core with the token, again assuming a numbering scheme of C3&C2&C1&C0 with rotation from C3 to C0, will be granted permission.

In addition, the socket step load controller may only "advance" the socket token to the next core if the core with the token actually receives an increase or decrease. As a result, a core to have the token, make no increase or decrease requests for a very long time, and hold on to the token while other cores continue to change their power level according to the above rules. However, if a core is marked as "halted", the socket step load controller may not allow the core to continue holding the token. Likewise, the socket step load controller may not allow the token to pass back to a core until it is taken out of the "halted" state. In other words, the socket step load controller may bypass halted cores in the token passing scheme described above.

Figure 6:
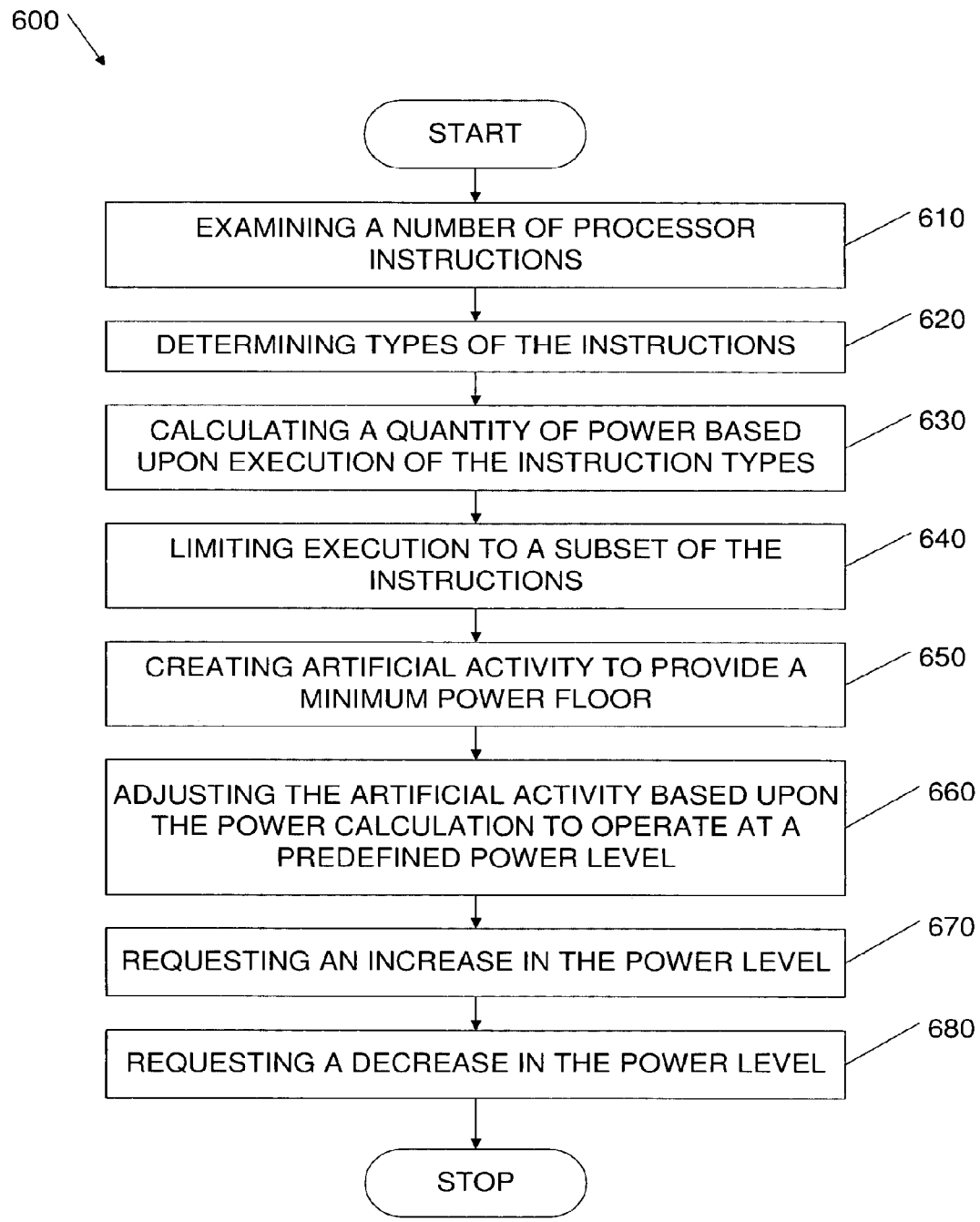
FIG. 6 illustrates a flowchart that may be used by to control step load for a processor.

FIG. 6 depicts a flowchart 600 illustrating a method of controlling step load for a processor that may be used in an embodiment. Flowchart 600 begins with examining a number of processor instructions (element 610). For example, instruction type determination logic 280 may monitor 10 instructions which are pending for a core. An embodiment according to flowchart 600 may continue by determining the types of the instructions (element 620). For example, instruction type determination logic 280 may examine the 10 pending instructions and determine that one of the instructions is a floating point instruction and another is a single instruction multiple data (SIMD) instruction.

An embodiment according to flowchart 600 may continue by calculating a quantity of power based upon execution of the instruction types (element 630). For example, power calculator 290 may examine two instructions to be executed on the next clock cycle and determine or estimate the amount of power that core 260 will require to process the instructions. An embodiment according to flowchart 600 may continue by limiting execution to a subset of the instructions in the instruction pool (element 640). Continuing with our previous example, assume that calculator 290 determines that one of the two instructions to be executed on the next cycle is a floating point instruction and will require a relatively large amount of power. To maintain the power consumption of core 260 within the permissible range, instruction throttling logic 250 may choose to only pass the other instruction to core 260 and hold the floating point instruction to be processed on the subsequent execution cycle.

The method of flowchart 600 may then create artificial activity to provide a minimum power floor (element 650). For example, core controller 230 may sense that only a few low-power instructions are available to issue on the next cycle due to dependencies on previous instructions completing. As a consequence of having few instructions available to issue, core controller 230 may need to generate some type of artificial activity to maintain the power level above the power floor. Core controller 230 may respond and trigger activity generator 265 to generate more activity and compensate for the lower instruction execution power. This may be necessary to maintain the power consumption of core 260 within the applicable power level (element 660). The method of flowchart 600 may continue by requesting an increase in the power level (element 670) or requesting a decrease in the power level (element 680). For example, as apparatus 200 continues to operate, the instruction queue may fill up with instructions that require relatively higher amounts of computation power. Core controller 230 may sense this by monitoring the amount of throttling performed by instruction throttling logic 250 and make a request to socket step load controller 210 for more power. Conversely, the instruction queue for core 260 may become empty due to the application being executed entering a phase of little activity. Core controller 230 may make note of this as well and request a decrease in power level.

It will be apparent to those skilled in the art having the benefit of this disclosure that the embodiments herein contemplate methods and apparatuses for controlling and/or reducing step load of processors. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

What is claimed is:

1. An apparatus comprising:
   determination logic to determine at least one type of instruction within an instruction stream to be executed by a core;
   power calculation logic to calculate power consumption associated with processing of the instruction stream based on the at least one type of instruction;
   throttling logic to limit a rate at which the instruction stream is to be processed based on the calculated power consumption;
   an activity generator to generate artificial activity for a core to maintain a minimum power floor;
   a core controller to control the activity generator and the throttling logic based upon the calculated power consumption; and
   a system controller to enable a plurality of cores to operate at different power levels, wherein the system controller is to determine a minimum amount of time lapse before allowing one of the plurality of cores to change from a first power level to a second power level.

2. The apparatus of claim 1, further comprising a plurality of core controllers, wherein at least one of the plurality of core controllers is to request the system controller to change operation of a corresponding core from a first power level to a second power level.

3. The apparatus of claim 1, wherein the system controller is to grant a plurality of requests for the plurality of cores using a token-based scheme.

4. The apparatus of claim 1, wherein the throttling logic is to limit rates at which the instruction stream is to be processed by the core.

5. A system, comprising:
   a plurality of cores;
   a plurality of core controllers each associated with one of the plurality of cores and to control a power level of the corresponding core; and
   a socket controller to monitor requests of the plurality of core controllers for changes to power levels of the plurality of cores, wherein the socket controller is to maintain an average power consumption, wherein the socket controller is to determine a minimum amount of time required before allowing one of the plurality of core controllers to cause a corresponding core to change from a first power level to a second power level.

6. The system of claim 5, wherein a first core controller is to request permission from the socket controller to change operation of a corresponding core from a first power level to a second power level.

7. The system of claim 5, further comprising a counter coupled to the socket controller to determine the minimum amount of time.

8. The system of claim 5, further comprising an activity generator associated with a first core to generate artificial activity for the core to maintain a minimum power floor.

9. A method comprising:
   examining a plurality of instructions to be processed by a processor to determine types of instructions in the plurality of instructions;
   calculating a quantity of power to be consumed by the processor in a period of execution based on the types of instructions;
   limiting execution of the processor in the execution period to a first subset of instructions of a first power level, and thereafter allowing a second subset of instructions of a second power level to be executed; and
   adjusting a created amount of artificial activity to maintain a minimum power floor, and creating the amount of artificial activity by one of turning on a clock to keep clock switching power constant, changing data patterns, and using power resistors.

10. The method of claim 9, further comprising adjusting the artificial activity, based upon the calculation of the quantity of power, to maintain operation of the at least one core of the processor within one power level of a plurality of power levels.

11. The method of claim 10, further comprising limiting execution of instructions of individual cores to control quantities of power of the individual cores and operating the individual cores within power levels having a respective maximum power level and a respective minimum power floor.

12. The method of claim 11, further comprising enabling the individual cores to operate at different power levels of the power levels to control overall power of the processor.

13. The method of claim 9, wherein the examining the plurality of instructions to determine the types of instructions comprises determining whether at least one of a memory instruction, a floating point instruction, a multimedia execution unit (MMU) instruction, and a single instruction multiple data (SIMD) instruction is present.

14. The method of claim 9, wherein the calculating the quantity of power to be consumed by the processor in the execution period includes calculating the quantity of power to be consumed by the processor in a clock cycle.

15. The method of claim 9, wherein the calculating the quantity of power to be consumed by the processor in the execution period includes calculating the quantity of power to be consumed by the processor in a plurality of clock cycles.

* * * * *